Dec. 22, 1970　　MINORU UMAHASHI ET AL　　3,549,255
SAFETY DEVICE FOR AUTOMATIC SEPARATION OF AN ORIGINAL FROM A
LIGHT SENSITIVE COPY SHEET IN AN AUTOMATIC COPYING APPARATUS
Filed April 24, 1968
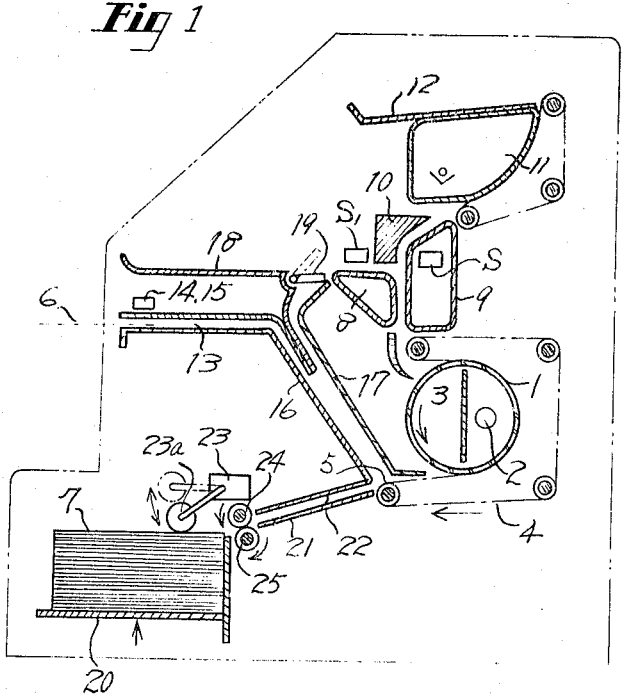
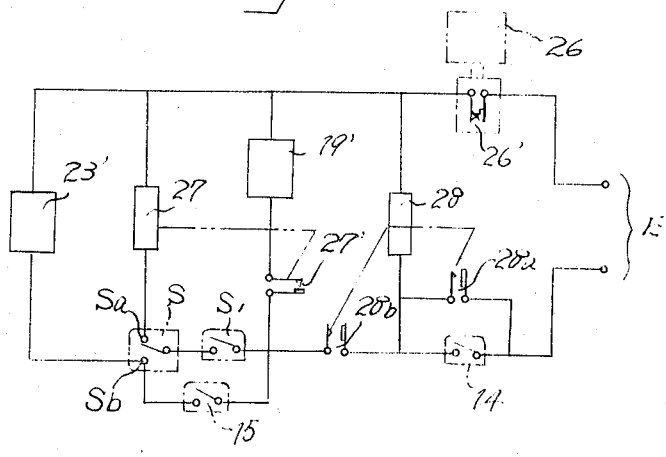
INVENTOR.
Minoru Umahashi
Hideo Hashimoto
BY
Burgess, Ryan & Hicks
ATTYS.

3,549,255
SAFETY DEVICE FOR AUTOMATIC SEPARATION OF AN ORIGINAL FROM A LIGHT SENSITIVE COPY SHEET IN AN AUTOMATIC COPYING APPARATUS
Minoru Umahashi and Hideo Hashimoto, Tokyo, Japan, assignors to Kabushiki Kaisha Ricoh, Tokyo, Japan, a corporation of Japan
Filed Apr. 24, 1968, Ser. No. 723,750
Int. Cl. G07b 27/12
U.S. Cl. 355—109
2 Claims

ABSTRACT OF THE DISCLOSURE

A copying machine makes multiple copies of an original by recycling the original through the machine during successive cycles, successively feeding a new copy sheet from a storage area for each cycle and superimposing it with the original during an exposure operation. The original and the copy sheet are separated and fed into different channels, the original for recycling and the copy sheet for developing. Sensors detect the presence of the original and the copy sheet in their respective channels, activating a feed mechanism for advancing a new copy sheet from the storage area for exposure during the next cycle. Failure of a copy sheet to enter its channel when the original has entered its own channel inactivates the feel mechanism and operates a diverter mechanism which halts the recycling of the original and delivers it outside the machine.

BACKGROUND OF THE INVENTION

This invention relates to a copying apparatus designed to produce multiple copies from one original form using light sensitive diazo-type copy sheets.

In order to make desired copies automatically from original form, various types of apparatus incorporating a so-called printing cylinder have heretofore been proposed, in which an original form is adapted to be rolled on the printing cylinder while the desired number of light sensitive copy sheets are automatically being fed into the apparatus. There are, however, many drawbacks inherent in the known types of apparatus, which are exemplified as follows:

(1) The longitudinal length of usable original forms will be limited by the length of outer circumference of the printing cylinder.

(2) A mechanism for mounting and detaching an original form on and away from a printing cylinder will become necessary. Further operation of such mechanism is normally complicated.

(3) A mechanism for aligning the leading edges of an original form and a copy sheet adapted to be overlaid with the original form tends to become complex. Because of these drawbacks, no practical success has yet been obtained with the known types of apparatus.

SUMMARY OF THE INVENTION

It is an object of this invention to provide a new device whereby faulty operation will be automatically detected electronically, whereupon printing operation will be caused to be stopped instantaneously so as to prevent repetition of undesirable operation thereafter.

BRIEF DESCRIPTION OF THE DRAWINGS

FIG. 1 is a side cross sectional view of only a main part of a copying apparatus, illustrating one embodiment of the present invention.

FIG. 2 is a diagram showing an electric circuit used in the above embodiment.

DESCRIPTION OF THE PREFERRED EMBODIMENT

For a fuller understanding of the nature and the objects of this invention, reference should be had to the following detail description taken in connection with the accompanying drawings wherein:

As shown in FIG. 1, 1 represents a printing cylinder which incorporates a light source 2 and a reflector plate 3. The printing cylinder is supported freely rotatable within a loop formed by a driving belt 4 which is extended over a plurality of rollers. An original form 6 and a light sensitive copy sheet overlaid therewith are inserted from an insertion mouth 5 and while they are moved within the loop between the rotatable cylinder and the driving belt, exposure or printing is effected.

They are then delivered upwardly out of the printing section from rear portion (facing the machine) of the cylinder. The original form and the exposed copy sheet are thereupon automatically separated by means of an original form suction cylinder 8 and a copy sheet suction cylinder 9 which are so provided as to face each other, the detailed description of which being herein abbreviated. The copy sheet 7 thus separated from the original form 6 is adapted to be transported to a developing section 11 by means of a guide member 10 and then delivered out onto a receiving tray 12.

The above series of operations may be carried out with a known mechanism employed in some of the copying machines.

On the other hand, the original form 6 is adapted to be returned to the insertion mouth 5 by virtue of a mechanism hereinafter described. In both channels, one for transporting the copy sheet 7 to the developing section 11 and the other for returning the original form 6 to the insertion mouth 5, are provided respectively, a contact for microswitches S and $S_1$, each in approximately the same distance from separation point of the original form and the copy sheet. 13 represents an original form insertion channel which is provided with two side-by-side, normally open microswitches 14 and 15 whose contacts are adapted to be closed by the inserted original form. The original form insertion channel is further opened to an original form conveyor channel formed by guide plates 16 and 17 which are extended towards the front of the printing cylinder 1 and adapted to guide the original form to aforesaid insertion mouth 5 for printing. Over said original form conveyor channel is provided a direction switching guide plate 19 carrying an activating source 19' (FIG. 2) therefor such as an electromagnet. The original form will keep on returning to the original form conveyor channel by means of said direction switching guide plate during an interval the activating source 19' is electrically conducted and as soon as the flow of electric current to the activating source is disrupted, the direction switching guide plate 19 will return to a position shown in solid line in FIG. 1, thereby causing the original form to be delivered out onto an original form receiving tray 18. 20 illustrates a vertically movable sheet table for holding a stack of copy sheets, which is adapted to be automatically raised by a mechanism not shown during copying operation so as to maintain the top surface of the stack at a predetermined level despite diminishing height of the stack as the sheets are delivered therefrom. Between said sheet table and the insertion mouth for printing 5 are extended guide plates 21 and 22 for copy sheets 7.

Further, adjacent to the sheet table is provided an automatic sheet feeding means 23 which carries, on a free end of an oscillating arm extended therefrom, a rotatable friction roller 23a such as one employed in normal offset printing machine.

The roller 23a is normally kept rotated by means of its association with a driving section for the printing cylinder and when activated by an electromagnetic clutch 23' incorporated in the sheet feeding means 23 (FIG. 2), the roller is pressed, as shown in actual line in FIG. 1, on the top of the stack, feeding automatically thereby the copy sheets 7 to the insertion mouth for printing 5 through rollers 24 and 25.

Referring now to FIG. 2, from electric source E through open type microswitch 14, and back through a contact 26' of a preset counter 26, there are a microswitch $S_1$ whose contact is adapted to be closed by a separated original form, a double throw microswitch S whose contacts are switchable by a separated exposed copy sheet, and an activating source 23' for the copy sheet feeding means 23 all of which are connected in series. The preset counter 26 is a so-called counting memory device in which desired number of copies is presettable and its contact 26' is adapted to be opened automatically upon completion of the prescribed copying operation.

Microswitch S may be designated as a "double throw switch" in that it contains two circuits, one which is normally closed through contact Sa but which is opened upon activation of the switch by a copy sheet, and the other of which is normally open but is closed through contact Sb upon activation of the switch by a copy sheet.

Connected at one end with a switch terminal Sa of the double throw microswitch S is a relay 27 which is provided in parallel with the activating source 23' for the friction roller 23a and is connected, through its contact 27' in parallel with an activating source 19' for the direction switching guide plate 19. Connected in parallel through the other switch terminal Sb of the double throw microswitch S, with the microswitch $S_1$ is an open type microswitch 15.

A relay 28 provided in the same circuit has contacts 28a and 28b, the former being connected in parallel and the latter in series with a microswitch 14 so as to maintain flow of electric current into the circuit irrespective of the opening movement of said microswitch 14.

When an original form 6 is inserted into the channel 13, switches 14 and 15 are adapted to be closed by said original form. When the switch 14 is closed, the electric current flows to the relay 28, whereupon contacts 28a and 28b will be closed, forming the three closed circuits:

(a) E–28a–28–26'–E
(b) E–28a–28b–27'–19'–26'–E
(c) E–28a–28b–15–23'–26'–E

Even after passage of the original form in front of the microswitch 14, as a result of electric current flowing into the circuit (a), so long as the contact 26' for the preset counter does not open, the contacts 28a and 28b of relay 28 are kept closed. Flow of electricity in circuit (b) causes direction guide plate 19 to move to a position shown in dotted lines in FIG. 1, thereby forming a circulation channel for the original form. So long as switch 15 is kept closed while circuit (c) is also closed, or during passage of the original form 6 in front of the switch 14, the activating source 23' for the sheet feeding means 23 will also be activated, causing the copy sheets on the sheet table to be delivered towards the insertion mouth 5 for printing.

The original form 6 and the copy sheet 7 are overlapped at the entrance of said insertion mouth 5 and then exposed during movement within a loop formed by the aforesaid printing cylinder 1 and the conveyor belt 4. After exposure, both the original form and the copy sheet are delivered upwardly from the rear portion of the printing cylinder, whereupon they will be automatically separated by the force of vacuum suction of suction cylinders 8 and 9. The original form thus separated closes the aforesaid switch $S_1$, while the copy sheet converts (activates) the double throw switch S. Movement of a movable contact piece of the double throw switch S away from a fixed terminal Sa to come in contact with the like terminal Sb causes the electric current to flow in a circuit E–28a–28b–$S_1$–Sb–23'–26'–E and permits, while the switches $S_1$ and S are being activated, the next copy sheet to be delivered from the stack by means of the sheet feeding means 23. The original form is returned towards the insertion mouth 5 by means of the guide plate 19 for exposure of the next copy sheet and likewise, automatic copying operation will be continued for the necessary copies, upon completion of which the contact 26' of the preset counter is adapted to open, thereby opening circuits (a), (b) and (c), whereupon the original form will be delivered out onto the receiving tray 18.

In the above described copying process, there are two possible cases where the original form and the copy sheet will not be automatically separated, and they are:

(A) when both the original form and the copy sheet are transported to the original form circulation channel, closing the switch $S_1$, (B) when both the original form and the copy sheet are sent into a channel leading to the developing section, activating the switch S.

In the case of A, the electric current flows from E to 28a–28b–$S_1$–Sa–27–26'–E, operating the relay 27 which, in turn, opens its contact 27' and disrupts the flow of electric current to the activating source 19' for the direction guide plate 19. This causes the direction guide plate 19 to move to a position shown in solid line in FIG. 1, sending both the original form and the copy sheet out onto the original form receiving tray 18. In this instance, since copy sheet feeding means is not activated, feeding of the next copy sheet will not take place.

In the case of B above, inasmuch as the switch $S_1$ is in an open position, conversion of switch S will not cause delivery of the following copy sheet from the stack and both the unseparated original form and the copy sheet will be delivered onto the receiving tray 12.

As apparent from heretofore description, with a device according to this invention the already exposed copy sheet is not liable to be fed into the original circulation channel even if separation of the original form from the copy sheet were inaccurate, and, therefore, dual exposure of the already once exposed copy sheet is not likely to occur. Furthermore, exposure of the already exposed copy sheet together with the following unexposed copy sheet will also be prevented.

Further still, inasmuch as the automatic feeding operation of new copy sheets is adapted to be completely stopped when the original form is delivered out of its circulation channel, waste of any copy sheet due to inaccurate separation of an original form from an overlapped copy sheet can be avoided.

The invention claimed is:

1. In a copying machine having an original form insertion channel adapted to receive an original form and convey said form to an original form conveyor channel; storage means for storing a plurality of copy sheets; sheet feeding means for feeding, when activated, a copy sheet from the storage means into a copy sheet channel, the copy sheet channel and the original form conveyor channel converging to an insertion mouth adapted to receive an original form superimposed upon the copy sheet; means for conveying the superimposed original form and copy sheet through an exposure section of the machine; means for separating the superimposed original form and copy sheet after passage through the exposure section and for guiding said separated original form and copy sheet into, respectively, an original form return channel and a copy sheet developing channel; means for transporting the copy sheet through the copy sheet developing channel through a developing section to a copy sheet receiving station; and diversion means movable between a first position in which the diversion means is adapted to divert an original from from the original form return channel into the original form conveyor channel and a second position in which the diversion means is adapted to divert an original form from the original form return channel to an original form receiving station; the improvement comprising (a) first detecting means for sensing the presence of the original form in the original form return channel;
(b) second detecting means for sensing the presence of the copy sheet in the copy sheet developing channel;
(c) activating means operative responsively to the first and second detecting means for activating the sheet feeding means when said first and second detecting means simultaneously sense, respectively, an original form and a copy sheet;
(d) diversion control means operative responsively to the first and second detecting means for moving the diversion means from the first position to the second position when the first detecting means senses the presence of the original form while the second detecting means fails to sense the presence of the copy sheet.

2. In a copying machine having an original form insertion channel adapted to receive an original form and convey said form to an original form conveyor channel; storage means for storing a plurality of copy sheets; sheet feeding means for feeding, when activated, a copy sheet from the storage means into a copy sheet channel, the copy sheet channel and the original form conveyor channel converging to an insertion mouth adapted to receive an original form superimposed upon the copy sheet; means for conveying the superimposed original form and copy sheet through an exposure section of the machine; means for separating the superimposed original form and copy sheet after passage through the exposure section and for guiding said separated original form and copy sheet into, respectively, an original form return channel and a copy sheet developing channel; means for transporting the copy sheet through the copy sheet developing channel through a developing section to a copy sheet receiving station; and diversion means movable between a first position in which the diversion means is adapted to divert an original form from the original form return channel into the original form conveyor channel and a second position in which the diversion means is adapted to divert an original form from the original form return channel to an original form receiving station; the improvement comprising (a) a normally-open first switch (14);
(b) a normally-open second switch (15);
(c) means for closing the first and second switches when an original form enters the original form insertion channel;
(d) first control means (23') for activating the sheet feeding means upon receipt of an electric current by said control means;
(e) second control means (19') for holding the diversion means in the first position when said second control means is connected to a source of electric energy and holding the diversion means in the second position when not so connected;
(f) a double-throw switch (S) movable between a normal state and a copy sheet detecting state, said double-throw switch when in the normal state having a closed first circuit through a first terminal (S$a$) and when in the copy sheet detecting state having a closed second circuit through a second terminal (S$b$);
(g) means for moving the double throw switch into the copy sheet detecting state only when a copy sheet is in the copy sheet developing channel;
(h) a normally-open original form detecting switch (S$_1$);
(i) means for closing the original form detecting switch only when an original form is in the original form return channel;
(j) a first relay (27) having normally-closed first relay contacts (27') openable when said first relay is energized by an electric current;
(k) a second relay (28) having a first set (28$a$) of normally-open contacts and a second set (28$b$) of normally-open contacts, both said sets being closed by the second relay when said second relay is energized by an electric current;
(l) circuit means connecting the second relay (28) across a source of electric current in series with the first switch (14);
(m) circuit means connecting the first set (28$a$) of normally open contacts across the first switch (14);
(n) circuit means connecting the first set (28$a$) of normally-open contacts, the second set (28$b$) of normally-open contacts, the first relay contacts (27'), and the second control means (19'), all in series, across a source of electric current;
(o) circuit means connecting the first set (28$a$) of normally-open contacts, the second set (28$b$) of normally-open contacts, the original form detecting switch (S'), the first circuit (S$a$) through the double throw switch (S), and the first relay (27), all in series, across the source of electric current;
(p) circuit means connecting the first set (28$a$) of normally-open contacts, the second set (28$b$) of normally open contacts, the normally-open second switch (15), and the first control means (23'), all in series, across the source of electric current;
(q) circuit means connecting the first set (28$a$) of normally-open contacts, the second set (28$b$) of normally open contacts, the original form detecting switch (S$_1$), the second circuit (S$_b$), and the first control means (23'), all in series, across the source of electric current; and
(r) means (26, 26') for shutting off the source of electric current to the above circuits upon the completion of a prescribed copying operation.

References Cited
UNITED STATES PATENTS

| | | | |
|---|---|---|---|
| 3,215,056 | 11/1965 | Campbell | 355—109 |
| 3,380,365 | 4/1968 | Umahashi | 355—106 |
| 3,416,863 | 12/1968 | Ralston | 355—110 |
| 3,419,328 | 12/1968 | Klosky et al. | 355—110 |

JOHN M. HORAN, Primary Examiner

R. L. MOSES, Assistant Examiner

U.S. Cl. X.R.

271—57; 355—106, 110